Feb. 26, 1935.    W. B. CLIFFORD ET AL    1,992,605
METHOD OF MAKING THERMOSTATIC UNITS FOR STEAM TRAPS AND THE LIKE
Filed Nov. 7, 1931
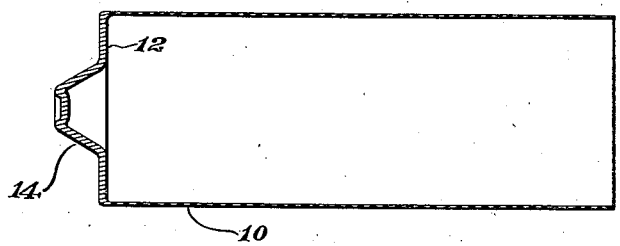
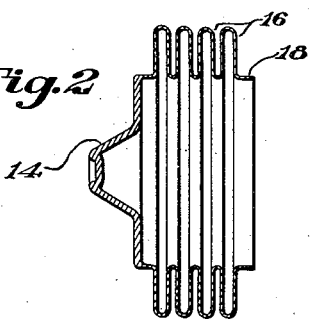 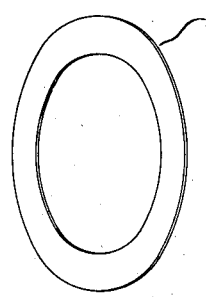 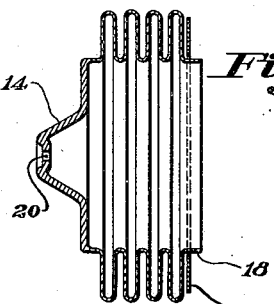
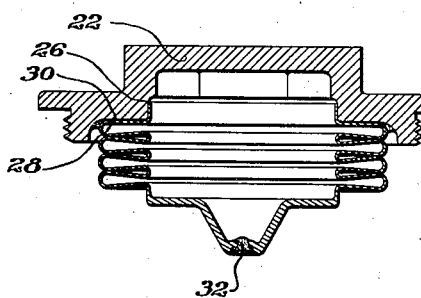
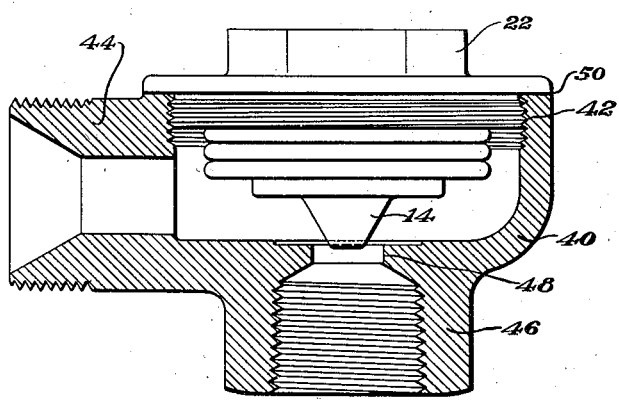
Witness
Paul F. Bryant
Inventors
Walter B. Clifford
John E. Woods Patented Feb. 26, 1935

1,992,605

UNITED STATES PATENT OFFICE 1,992,605

METHOD OF MAKING THERMOSTATIC UNITS FOR STEAM TRAPS AND THE LIKE

Walter B. Clifford, Boston, and John E. Woods, Brookline, Mass., assignors to Clifford Manufacturing Co., Boston, Mass., a corporation of Delaware Application November 7, 1931, Serial No. 573,600

1 Claim. (Cl. 29—148.2)

The present invention relates to methods of producing thermostatic units for steam traps or the like.

The object of the invention is to produce efficiently and economically a thermostatic unit suitable for incorporation in a steam trap or similar device where uniform operation under predetermined temperature conditions is desired.

To the accomplishment of this object we propose to form a metallic bellows from a cupped drawn tube open at one end and having its closed and integral end formed to provide a tapered valve. After formation of the metallic bellows in a manner which will be evident to those skilled in the art, with a reduced neck portion at the open end, the latter is assembled with a cast or forged cap having a centering depression in which the neck is received. While so assembled the metallic bellows and cap may be solder bonded in the space between their opposing surfaces to seal the space encompassed by the metallic bellows and closed by the cap. Prior to bonding to the cap the valve end of the bellows is pierced with a small opening extending through the tip of the valve, and subsequent to sealing the interior of the bellows is provided with thermostatic fluid such as water or alcohol inserted through the opening and thereafter sealed under a vacuum by hermetically closing the opening. This combined cap and thermostatic unit may be effectively employed in a steam trap as illustrated by merely assembling the cap with a trap body having an outlet port properly aligned with the formed valve on the bellows.

In the accompanying drawing Fig. 1 represents a section of a cupped drawn tube from which the bellows is formed with the closed end shaped to provide a valve; Fig. 2 illustrates a section of the bellows folds formed in the tube; Fig. 3 represents the same bellows with the hole pierced through the valve and a solder ring ready for assembly with the cap; Fig. 4 represents a perspective of a solder ring adapted to be used for bonding the bellows and cap; Fig. 5 represents a unit complete, assembled and filled and sealed; and Fig. 6 represents a section in elevation of a complete trap embodying the thermostatic unit.

The metallic bellows are formed from a cupped drawn tube 10 having an integral closed bottom portion 12 of substantially greater thickness than the thickness of the tube wall. The thicker closed bottom portion is shaped by a drawing operation to form a tapered extension 14, and provide a valve protruding from the bottom of the tube. Thereafter a series of convolutions 16 are formed in the length of the tube in a manner to leave a neck portion 18 projecting from the open end of the tube. These convolutions may be and preferably are formed hydraulically according to the method disclosed in the patent issued to Clifford, No. 1,823,532. After the formation of the bellows folds in the tube, the latter is pierced with an opening 20 through the tip of the valve 14, and is next assembled with a cap 22 after having previously surrounded the neck 18 with a solder ring 24.

The bellows unit is centered at its open end with respect to the cap through the provision of a circular recess 26 formed interiorly of the cap and centrally thereof, the neck being received within this recess and centered thereby, and the outer wall 28 of the first bellows fold being supported by the imposing flat face 30 of the cap with a solder film therebetween, this solder film bonding the bellows unit hermetically to the cap. The soldering is effected by merely elevating the temperature of the cap to a point at which the solder will flow, the opposing surfaces having been previously treated to insure a good bond. The provision of the aperture at the tip end of the bellows serves to promote escape of air and gases which expand upon raising the temperature of the unit to the soldering point and which would otherwise be trapped within.

After hermetically sealing the bellows unit to the cap as indicated, the interior of the unit is filled through the opening with thermostatic fluid which, in the case of a steam trap, may be a quantity of water. The interior of the unit is subjected to a vacuum, and finally the water sealed therein under a vacuum by closing the opening 20 through the provision of a solder button 32. An equivalent method of closing such as a plug might likewise be employed if so desired. The completed unit suitable for insertion in a steam trap may be thereafter assembled to form a completed trap by threading the cap 22 into the upper portion of a trap body 40 through the threaded portions 42. The trap body is provided with an inlet connection 44 at one side, and an outlet connection 46 at the bottom. It may also be provided with an outlet port 48 which in assembled relation is aligned with the valve 14. The cap is sealed to the trap body by engagement of the opposing plane surfaces 50.

The foregoing method affords an economical method of producing a thermostatic unit of uniform characteristics which may serve either in the manufacture of new steam traps, or as a replacement unit for existing traps.

What is claimed is:

A method of producing a thermostatic unit suitable for use in steam traps which consists in forming bellows convolutions in a thin wall tube integrally closed at one end, assembling the bellows tube with the open end engaging a cap for a trap body, bonding the tube and cap at abutting surfaces to provide an expansible closed chamber therewithin, venting the expansible chamber during the bonding operation through an aperture formed in the integral closed end of the tube, subsequently exhausting and filling the expansible chamber with a thermostatic medium, and hermetically closing the aperture to seal the filled expansible chamber.

WALTER B. CLIFFORD.
JOHN E. WOODS.